(12) United States Patent
Van Meurs (10) Patent No.: US 7,587,378 B2
(45) Date of Patent: Sep. 8, 2009

(54) EMBEDDED RULE ENGINE FOR RENDERING TEXT AND OTHER APPLICATIONS

(75) Inventor: Pim Van Meurs, Kenmore, WA (US)

(73) Assignee: TEGIC Communications, Inc., Seattle, WA (US)

( * ) Notice: Subject to any disclaimer, the term of this patent is extended or adjusted under 35 U.S.C. 154(b) by 533 days.

(21) Appl. No.: 11/380,494

(22) Filed: Apr. 27, 2006

(65) Prior Publication Data

US 2007/0156618 A1 Jul. 5, 2007

Related U.S. Application Data

(60) Provisional application No. 60/749,225, filed on Dec. 9, 2005.

(51) Int. Cl.
  *G06N 5/02* (2006.01)
  *G06N 5/00* (2006.01)
(52) U.S. Cl. .................................................. 706/46
(58) Field of Classification Search ................ None
  See application file for complete search history.

(56) References Cited

U.S. PATENT DOCUMENTS

| | | | |
|---|---|---|---|
| 5,109,352 A | 4/1992 | O'Dell | |
| 5,952,942 A | 9/1999 | Balakrishnan et al. | |
| 6,009,444 A | 12/1999 | Chen | |
| 6,054,941 A | 4/2000 | Chen | |
| 6,104,317 A | 8/2000 | Panagrossi | |
| 6,169,538 B1 | 1/2001 | Nowlan et al. | |
| 6,172,625 B1 | 1/2001 | Jin et al. | |
| 6,204,848 B1 | 3/2001 | Nowlan et al. | |
| 6,362,752 B1 | 3/2002 | Guo et al. | |
| 6,424,743 B1 | 7/2002 | Ebrahimi | |
| 6,430,409 B1 * | 8/2002 | Rossmann | 455/422.1 |
| 6,502,118 B1 | 12/2002 | Chatterjee | |
| 6,686,852 B1 | 2/2004 | Guo | |
| 6,711,290 B2 | 3/2004 | Sparr et al. | |

(Continued)

FOREIGN PATENT DOCUMENTS

WO    WO 2004/111812    12/2004

(Continued)

OTHER PUBLICATIONS

Potipiti et al., Tanapong, "Towards an Intelligent Multilingual Keyboard System", 2001.*

(Continued)

*Primary Examiner*—David R Vincent
*Assistant Examiner*—Adrian L Kennedy
(74) *Attorney, Agent, or Firm*—Michael A. Glenn; Glenn Patent Group (57) ABSTRACT

A computing apparatus includes a display to present human-readable information and a user input facility. A rule data store contains a statement of rules governing prescribed aspects of presenting data upon the display. These aspects include those aspects subject to variation by language whenever the following changes: type of data, and/or nature of user-operation being performed involving the data. A rules engine is configured to implement the rules. One or more common programs are configured to recognize conditions for applying the rules, and in response, to invoke the rules engine.

20 Claims, 4 Drawing Sheets

U.S. PATENT DOCUMENTS

| | | |
|---|---|---|
| 6,757,544 B2 | 6/2004 | Rangarajan et al. |
| 6,801,659 B1 | 10/2004 | O'Dell et al. |
| 6,807,529 B2 | 10/2004 | Johnson et al. |
| 6,864,809 B2 | 3/2005 | O'Dell et al. |
| 6,912,581 B2 | 6/2005 | Johnson et al. |
| 6,947,771 B2 | 9/2005 | Guo et al. |
| 6,955,602 B2 | 10/2005 | Williams |
| 6,956,968 B1 | 10/2005 | O'Dell et al. |
| 6,973,332 B2 | 12/2005 | Mirkin et al. |
| 6,982,658 B2 | 1/2006 | Guo |
| 7,020,849 B1 | 3/2006 | Chen |
| 7,057,607 B2 | 6/2006 | Mayoraz et al. |
| 7,075,520 B2 | 7/2006 | Williams |
| 7,095,403 B2 | 8/2006 | Lyustin et al. |
| 7,139,430 B2 | 11/2006 | Sparr et al. |
| 7,256,769 B2 | 8/2007 | Pun et al. |
| 7,257,528 B1 | 8/2007 | Ritchie et al. |
| 7,272,564 B2 | 9/2007 | Phillips et al. |
| 7,313,277 B2 | 12/2007 | Morwing et al. |
| 7,349,576 B2 | 3/2008 | Holtsberg |
| 7,389,235 B2 | 6/2008 | Dvorak |
| 7,437,001 B2 | 10/2008 | Morwing et al. |
| 7,466,859 B2 | 12/2008 | Chang et al. |
| 2002/0087515 A1 | 7/2002 | Swannack et al. |
| 2002/0135499 A1 | 9/2002 | Guo |
| 2003/0023426 A1 | 1/2003 | Pun et al. |
| 2003/0054830 A1 | 3/2003 | Williams et al. |
| 2003/0144830 A1 | 7/2003 | Williams |
| 2003/0179930 A1 | 9/2003 | O'Dell et al. |
| 2004/0039990 A1 | 2/2004 | Bakar et al. |
| 2004/0123101 A1 | 6/2004 | Rineer et al. |
| 2004/0153963 A1 | 8/2004 | Simpson et al. |
| 2004/0153975 A1 | 8/2004 | Williams et al. |
| 2004/0163032 A1 | 8/2004 | Guo et al. |
| 2004/0199398 A1 | 10/2004 | Kubota |
| 2004/0201607 A1 | 10/2004 | Mulvey et al. |
| 2005/0114770 A1 | 5/2005 | Sacher et al. |
| 2005/0198023 A1* | 9/2005 | James et al. .................. 707/4 |
| 2006/0129928 A1 | 6/2006 | Qiu |
| 2006/0136408 A1 | 6/2006 | Weir et al. |
| 2006/0155536 A1 | 7/2006 | Williams et al. |
| 2006/0158436 A1 | 7/2006 | LaPointe et al. |
| 2006/0173807 A1 | 8/2006 | Weir et al. |
| 2006/0193519 A1 | 8/2006 | Sternby |
| 2006/0236239 A1 | 10/2006 | Simpson et al. |
| 2006/0239560 A1 | 10/2006 | Sternby |
| 2007/0094718 A1 | 4/2007 | Simpson |
| 2007/0203879 A1 | 8/2007 | Templeton-Steadman et al. |
| 2007/0276814 A1 | 11/2007 | Williams |
| 2007/0285397 A1 | 12/2007 | LaPointe et al. |
| 2008/0130996 A1 | 6/2008 | Sternby |

FOREIGN PATENT DOCUMENTS

| | | |
|---|---|---|
| WO | WO 2004/111871 | 12/2004 |
| WO | WO2004/111812 | 3/2006 |
| WO | WO 2006/026908 | 3/2006 |

OTHER PUBLICATIONS

Matiasek et al., Johannes, "FASTY—A Multilingual Approach to Text Prediction", 2002.*

Dunlop et al., Mark, "Predictive Text Entry Methods for Mobile Phones", 2000.*

A. Schmidt, K. Aidoo, A. Takaluoma, U. Tuomela, K. Van Laerhoven, and W. Van de Velde; Advanced Interacton in Context; TecO University of Karlsruhe, Germany; Starlab Nv/Sa Brussel, Belguim; Nokia Mobile Phones Oulu, Finland.

A. K. Dey and G. D. Abowd; Towards a Better Understanding of Context and Context-Awareness; Graphics, Visualization and Usability Center and College of Computing, Georgia Institute of Technology, Atlanta, GA.

J. Hall; Adaptive Disambiguation; Dec. 22, 2003; http://www.thefeaturearchives.com/100293.html.

* cited by examiner

EMBEDDED RULE ENGINE FOR RENDERING TEXT AND OTHER APPLICATIONS

CROSS-REFERENCE TO RELATED APPLICATIONS

This application claims the benefit of the following earlier-filed U.S. Provisional Application in accordance 35 USC 119: U.S. Application No. 60/749,225 filed Dec. 9, 2005, entitled "Embedded Rule Engine for Rendering Text and Other Applications." This application is incorporated herein by reference in its entirety.

BACKGROUND OF THE INVENTION

1. Field of the Invention

The present invention relates to handheld computing devices such as cell phones and personal data assistants. More particularly, the invention concerns a handheld computer that uses a rules engine to honor rules that govern aspects of data presentation that can vary from language to language according to the data type or the nature of user-operation being performed. In honoring the rules, the rules engine helps to ensure that data are automatically presented, and user initiated operations behave, in compliance with a designated language.

2. Description of the Related Art

Handheld computing devices are quite popular today. Computer-enabled cell phones and personal data assistants are two examples. At minimum, these devices include a user display, a physical or virtual keypad or a digitizing surface for user input, and a digital data processor housed in a case.

To communicate effectively with the human user, such devices must provide their output in one language or another. Typically, the programming of the data processor honors one such language exclusively. This programming may be implemented in various ways, such as using a general purpose processor to execute instructions, or by programming circuitry such as an application specific integrated circuit (ASIC), field programmable gate array (FPGA), etc. More specifically, the programming of a computing device to observe one language or another is typically implemented in its operating system, coupled with availability of the corresponding fonts.

Although this arrangement enjoys widespread popularity, there are still some issues. First, the task of writing different operating system versions for different languages can be time consuming and expensive. Consequently, some manufacturers might forego writing operating systems for languages with a relatively small number of speakers, because they provide a relatively small number of potential customers. For people that speak these languages, it may be frustrating to find a handheld computer that is programmed to observe these languages.

A second issue is that manufacturers, faced with hundreds or thousands of available languages, can find it difficult to select one language to incorporate into its handheld computing devices. Some manufacturers plan to produce different devices programmed in different languages in the same proportion as the languages of the expected buyers. However, the market can change significantly in the lag time between manufacture and sale, making precise planning all but impossible. This can leave the manufacturer or its distributors stuck with products programmed in a language that is a slow seller.

A third issue is that, in the rare case somebody who speaks a rare language can somehow find a handheld device programmed in their language, they might be stuck with that device. It could be difficult to resell the device in the future because the vast majority of buyers probably speak another language, such as English or Chinese or Spanish.

Consequently, due to certain unsolved problems, language-specific programming of known handheld computing devices may not always satisfy all manufacturers or consumers.

SUMMARY OF THE INVENTION computing apparatus includes a display to present human-readable information and a user input facility. A rule data store contains a statement of rules governing prescribed aspects of presenting data upon the display. These aspects include those aspects subject to variation by language whenever the following changes: type of data, and/or nature of user-operation being performed involving the data. A rules engine is configured to implement the rules. One or more common programs are configured to recognize conditions for applying the rules, and in response, to invoke the rules engine.

The teachings of this disclosure may be implemented as a method, apparatus, logic circuit, signal bearing medium, or a combination of these. This disclosure provides a number of other advantages and benefits, which should be apparent from the following description.

DETAILED DESCRIPTION

The nature, objectives, and advantages of the invention will become more apparent to those skilled in the art after considering the following detailed description in connection with the accompanying drawings.

Hardware Components & Interconnections

Overall Structure

One aspect of the present disclosure concerns a computing device. Without any intended limitation, this device may be implemented as a handheld device with computing functions, such as a wireless phone, PDA, etc.

Figure 1A:
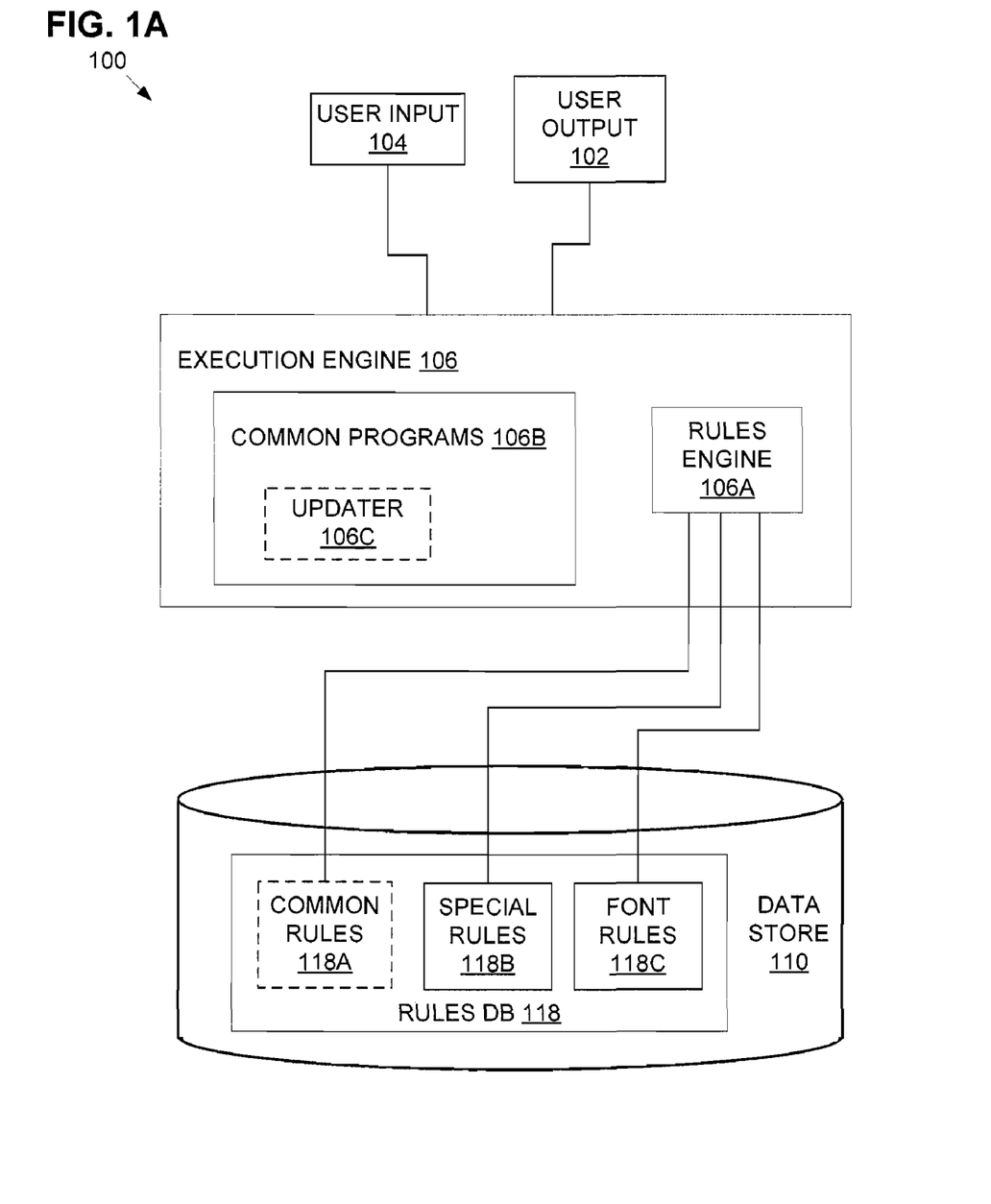
FIG. 1A is a block diagram of the components and interconnections of a computing device.

FIG. 1A shows an exemplary computing device 100. Basically, the device 100 employs an execution engine 106 to perform various computing tasks as instructed by a user (not shown). The engine 106, as well as all other functional components of the device 100, may be implemented by one or more hardware devices, software devices, a portion of one or more hardware or software devices, or a combination of the foregoing. The makeup of these subcomponents is described in greater detail below with reference to FIGS. 2-4.

The engine 106 interacts with the user via user input facility 104 and user output facility 102. The input 104 is a physical or on-screen keypad or keyboard, digitizing surface, pointing device, or any other user input apparatus suitable for the operations discussed below. The output 102 includes a compact color or monochrome display screen utilizing LCD or any other technology appropriate to the operations discussed herein. The output 102 may include further components such as a buzzer, sound generator, vibration mechanism, speaker, or other output device.

The engine 106 includes common programs 106b and a rules engine 106a. These components are described in greater detail below.

Common Programs

Basically, the common programs 106b illustrate the device 100's processing capabilities outside the particular functions of the rules engine 106a, described below. Basically, the common programs 106b include various processing whose behavior is fixed according to one language, or otherwise independent of variance by language. As for functions that do vary with language, these are handled by the act of the rules engine 106a honoring the special rules 118b as discussed in detail below.

The common programs 106b may include various application programs, system functions, operating systems, operating system components, device drivers, graphics rendering, and the like. Some examples of application programs include tasks such as word processing, dialing phone numbers, address book, calendar, spreadsheets, and the like. To boost computing efficiency, the programs 106b may include various lower level, shared application programs subject to call by higher level programs. These programs may be subroutines or library functions, for example. These shared programs carry out tasks such as receiving user input via 104, displaying user input at 102 as data is entered, resolving ambiguities in user entries (such as handwriting recognition or T9 input), sorting data, providing telephone ringer or vibrate functions, managing the display 102 and user input 104, managing a file system, performing operating system level functions, etc.

Optionally, the common programs 106b may include a user input disambiguation program to help interpret ambiguous user input. For example, this program may assist the user in spelling words using telephone keys, which always provide an ambiguous user input since most keys correspond to three possible letters. Some exemplary disambiguation programs are illustrated in the following references, which are each incorporated herein by reference. U.S. Pat. No. 5,953,541 entitled "Disambiguating System for Disambiguating Ambiguous Input Sequences by Displaying Objects Associated with the Generated Input Sequences in the Order of the Decreasing Frequency of Use," issued Sep. 14, 1999 in the names of King et al. U.S. Pat. No. 6,307,548 entitled "Reduced Keyboard Disambiguating System," issued on Oct. 23, 2001 in the names of Flinchem et al. U.S. Pat. No. 5,818,437 entitled "Reduced Keyboard Disambiguating Computer" issued on Oct. 6, 1998 in the names of Grover et al.

Figure 1B:
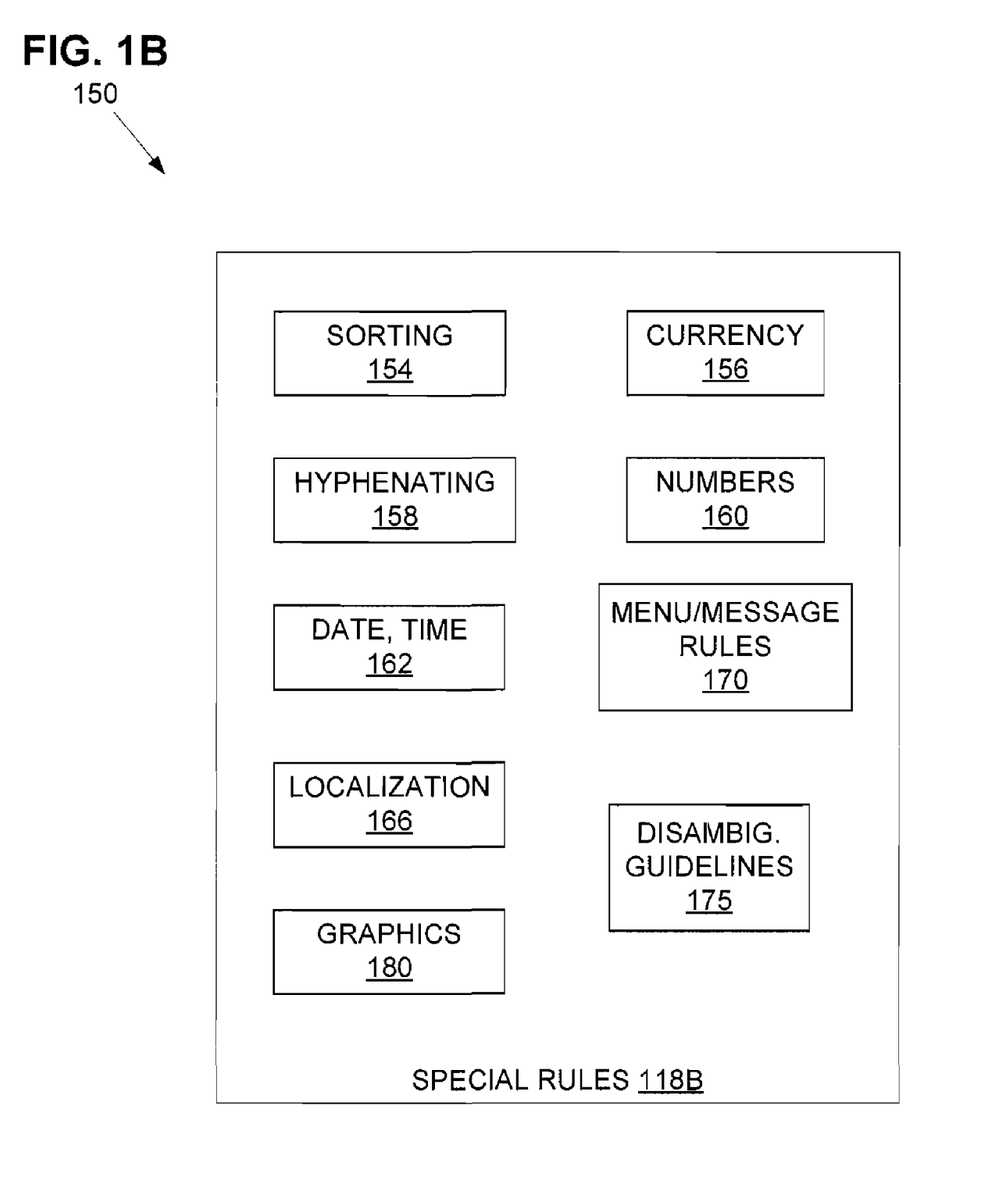
FIG. 1B is a block diagram of a rules database.

To further enhance operation of the user input disambiguation program, the disambiguation application program may employ various special rules 118b aimed at disambiguation. An example of such rules (175) is discussed below.

The programs 106b may further include a rendering engine to render graphics. This rendering engine receives high level input from the other programs 106b and, in response, directs specific pixel-level presentation instructions to the user output 102. In one example, the rendering engine receives a wide ranging universal character map such as Unicode. In another example, the rendering engine utilizes a more specialized encoding such as a language-specific, with Latin-7 being one example. Since graphics rendering is densely populated field of art, ordinarily skilled artisans (having the benefit of this disclosure) will recognize a variety of different technologies suitable to implement a rendering engine appropriate to their specific application.

Another component of the common programs 106b is the updater 106c. The updater 106c is an optional module of hardware and/or software module to update components of the special rules 118b. Of course, the updater 106c may be implemented to update additional components than these, if desired. As implemented, however, the updater 106c is programmed to download updates from a remote location and substitute the updates for at least part of the rules 118b, in order to cause the rule engine 106a to observe a different language.

Rules Engine

The rules engine 106a honors various rules contained in the rules database 118. The engine 106a may be a separate part of the execution engine 106 or seamlessly integrated into the engine 106. In contrast to the components 106b, which (in the present example) execute programming instructions, the engine 106a honors rules 118. In one example, rules are written in an easily changeable form such as a regular expression. Regular expressions are well known constructs, also known as a "regexp" or "regex" or "regxp." Broadly, a regular expression is a string that describes or matches a set of strings, optionally according to certain syntax rules. The rules 118 may be stated in other forms than regular expressions. Regardless of the format and syntax, each rule serves to describe an input string to output string manipulation. In one example, the rules engine 106a reads the rules 118 and transforms them into a finite state machine for execution.

As discussed below, language specific rules are contained in the special rules 118b. There may be one set of special rules 118b for a single-language installation, or multiple sets of rules 118b each corresponding to a different language. In any case, there is one language of installation. For a single-language installation, this language is the language of installation because that is what is installed in the machine 100. For a multiple language machine, the operating system (part of 106b) facilitates user selection of one of these languages, whereupon the rules engine 106a observes user selection of one language or another. Here, the user-selected language is the language of installation.

In one example, the rules engine 106a and rules 118 are embedded in the device 100, because the rules engine 106a is a special purpose computer encapsulated by the device 100 that it controls. The programming for the rules engine 106a may be incorporated into source code, compiled code, executable code, or other implementation of the execution engine 106.

Data Store

The data store 110 is implemented by digital data storage, as discussed in greater detail below. The rules database 118 is contained in the store 110. In embodiments using the updater 106c, some or all rules of the database 118 (at least the special rules 118b) are contained in rewritable storage, to facilitate changes supervised by the updater 106c. The content of the data store 110 may occur in the form of files, pages, registers, linked lists, tables, strings, relational databases, or any other conceivable data structure.

Rules

The rules 118a-118c, as discussed further below, are implemented as data rather than programming instructions, and these data provide guidelines for the presentation, sorting, and other activities particular to a certain language. Therefore, the engine 106a does not execute the rules 118 but rather honors them. In this respect, the rules 118 may be implemented in an easily changeable form such as a regular expression. However, a variety of other suitable formats may be used to serve the purpose of describing input string to output string manipulation.

As illustrated, the rules database 118 includes common rules 118a, special rules 118b, and font rules 118c. The common rules 118b do not specify behavior that changes from language to language, but the special rules 118b do. Alternatively, the common rules 118a may be omitted, with the execution engine 106 performing such common functions by executing appropriately configured application programs 106b.

The font rules 118c prescribe rules for displaying certain characters according to the language of installation. For example, one font rule for French recognizes ligatures by prescribing that when "oe" occur together, always move the "e" ten pixels to the left. If the device 100 is implemented for the Dutch language, a font rule 118c implements kerning (hinting) by prescribing that when "ij" occur together, the "j" is moved five pixels to the left.

In one example, the font rules 118c may be implemented by using well known technology such as the font tables employed in OpenType font or TrueType font technology. Further information about these is available in the OpenType specification v.1.4 and related documents promulgated by Microsoft Corporation In contrast to the special rules 118b (described below), which dictate various rudimentary aspects of text display, the font rules 118c do not contemplate higher level operations such as replacing one or more characters by others, reordering characters in a string, sorting, finding syllable boundaries, and the like.

Special Rules

Broadly, the special rules 118b govern prescribed aspects of how data should be presented at 102. These aspects include those characteristics that can vary from language to language according to the type of data and/or the nature of the user-operation being performed upon the data.

Language

As mentioned above, the special rules 118b govern data presentation aspects that vary from language to language according to certain factors. "Language" as used in this application refers to different systems of communication including words and the methods of combining them as understood by a community. Some examples of different languages include English, French, German, and Spanish.

"Languages" as used herein includes other concepts as well. Namely, to more conveniently express various additional concepts using a single term, different "languages" are additionally understood to include different dialects, locales, etc. "Dialects" refers to variations in languages used by people of a particular subgroup. For example, some consider British English and American English to be different dialects of English. "Locale" refers to language variations where words or their method of use vary by geographic location. Different "languages" as used herein may further include includes other language variations or subsets, such as registers, sociolects, jargons, slangs, idolects, standard languages, diglossia, diasystems, pluricentric languages, etc.

Type of Data & User Operation

As mentioned above, the special rules 118b govern data presentation aspects that vary from language to language according the type of data and/or nature of user operation performed on the data.

As to type of data that warrant changing display 102 to account for language, some examples include numbers, currency, date, time, telephone numbers, street addresses, zip codes, language names, and others. For example, the same raw number, when displayed as currency, must be shown differently depending upon the applicable language, e.g. "1,000" in American English or "1.000" in Dutch.

As to user-operations that warrant changing the display 102 to account for language, some examples include sorting, showing a menu, showing messages, hyphenation, word break, etc. For example, the same text list may be sorted differently depending upon the applicable language, since the alphabet of different languages may be ordered differently.

Further Examples

FIG. 1B illustrates further examples of the special rules 118b. Among the rules 118b are rules 154 for sorting alphanumeric text, rules 156 for representing currency, rules 158 for hyphenating text, rules 160 for representing numbers, rules 162 for representing date and/or time, menu/message rules 170, localization rules 166, disambiguation guidelines 175, and graphics rules 180. The content and operation of some exemplary rules are discussed as follows.

In one case, a localization rule 166 may prescribe that whenever Unicode characters N1, N2, and N3 occur in a sequence, then replace N1 with N2 and move N3 in front of N2. Localization rules treat situations where characters are subject to being reordered, substituted, or otherwise modified in a particular language.

As an example of a numbers 160 rule for the Dutch language, commas and periods are switched whenever the type of data is numeric. As an example of a currency 156 rifle for Dutch, "FL" or the Euro symbol is substituted for "$." An exemplary date rule 162 may change the order of the day and month in a numerical date representation.

An exemplary Hindi hyphenation rule 158 recognizes appropriate syllable boundaries for Hindi words, and recommends the appropriate word breaks. An exemplary German sorting rule 154 recognizes characters that are not present in the English alphabet, and sorts appropriate to the order of such characters in the relevant alphabet. In addition to hyphenation as illustrated, the rules 158 may further include syllabification, wordbreak and hyphenation rules. Hyphenation is particularly relevant in compound languages such as Finnish or German where long words need to be appropriately 'wrapped' in the small phone displays. In Thai, no spaces are used and rules 158 may conduct wordbreak based on syllables.

The menu/message rules 170 operate as follows. Menu rules contain a mapping between various system or application program menu entries and their corresponding name in the language of installation. For example, the menu rule may indicate that a particular menu entry should be shown as "Edit" for English applications. Accordingly, whenever the rules engine 106a invokes the menu rules, execution of this rule directs the rendering engine to display "Edit" for this menu entry. The menu-entry-to-name mapping may be contained as part of the rule itself, or the rule may refer to a mapping external to the rule. A single mapping or multiple mappings may be invoked to map the menu entry to multiple or even all languages.

Message rules 170 operate in similar fashion, but for system generated messages. Message rules contain a mapping between system generated messages, such as "OK to delete?", and their phrasing in one or more languages of installation.

As mentioned above, the application programs 106b may include a user input disambiguation program to help interpret ambiguous user input. To support the operation of this program, the special rules 118b may include disambiguation guidelines 175 for help with language specific issues. The guidelines 175 may comprise, for example, a vocabulary of recognized words and other potential user entries according to the language of installation. When, for example, the user is spelling a word using telephone keys, the disambiguation application program (of 106b) recruits the rules engine 116a in comparing the user's ambiguous output (since each key really corresponds to three letters) to the vocabulary (175) to identify possibly intended input words.

The special rules 118b may be implemented to provide rules implementing a single language, or the rules 118b may include multiple subsets for multiple languages. In the multiple language example, application programs 106b may further permit the user to actively switch between languages as desired, or a switch between languages may be driven by context or other passive input.

Exemplary Digital Data Processing Apparatus

As mentioned above, data processing entities (such as the execution engine 106 or any component thereof may be implemented in various forms.

Some examples include a general purpose processor, digital signal processor (DSP), application specific integrated circuit (ASIC), field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g. a combination of a DSP and a microprocessor, a plurality of microprocessors, one or more microprocessors in conjunction with a DSP core, or any other such configuration.

Figure 2:
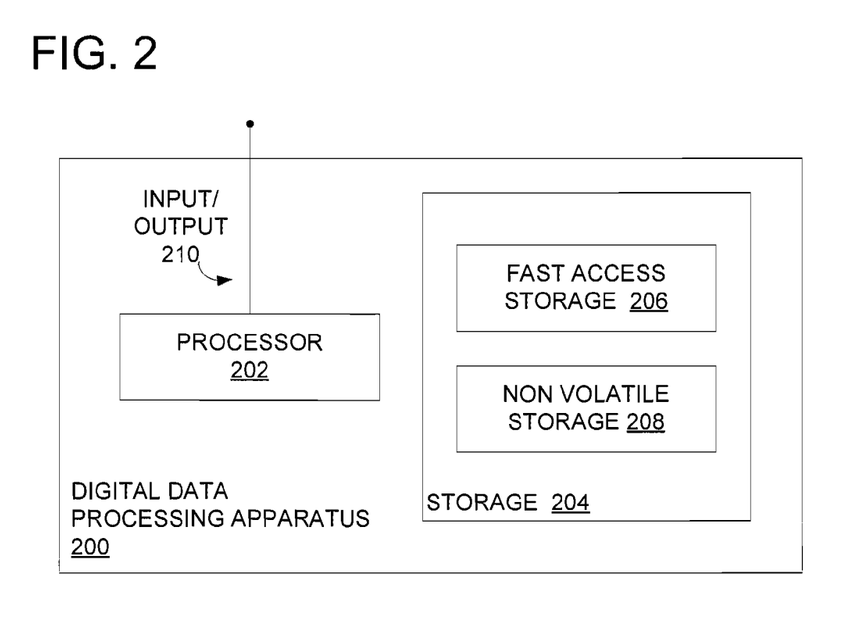
FIG. 2 is a block diagram of a digital data processing machine.
Figure 3:
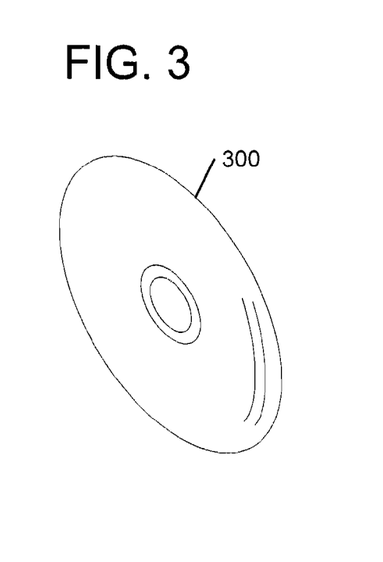
FIG. 3 shows a signal-bearing medium.

As a more specific example, FIG. 2 shows a digital data processing apparatus 200. The apparatus 200 includes a processor 202, such as a microprocessor, personal computer, workstation, controller, microcontroller, state machine, or other processing machine, coupled to storage 204. In the present example, the storage 204 includes a fast-access storage 206, as well as nonvolatile storage 208. The fast-access storage 206 may be used, for example, to store the programming instructions executed by the processor 202. The storage 206 and 208 may be implemented by various devices, such as those discussed in greater detail in conjunctions with FIGS. 3 and 4. Many alternatives are possible. For instance, one of the components 206, 208 may be eliminated; furthermore, the storage 204, 206, and/or 208 may be provided on-board the processor 202, or even provided externally to the apparatus 200.

The apparatus 200 also includes an input/output 210, such as a connector, line, bus, cable, buffer, electromagnetic link, network, modem, or other means for the processor 202 to exchange data with other hardware external to the apparatus 200.

Signal-Bearing Media

As mentioned above, various instances of digital data storage may be used, for example, to provide the storage used in the system 100 such as the data store 110 (FIG. 1), to embody the storage 204 and 208 (FIG. 2), etc. Depending upon its application, this digital data storage may be used for various functions, such as storing data, or to store machine-readable instructions. These instructions may themselves aid in carrying out various processing functions, or they may serve to install a software program upon a computer, where such software program is then executable to perform other functions related to this disclosure.

In any case, the signal-bearing media may be implemented by nearly any mechanism to digitally storage machine-readable signals. One example is optical storage such as CD-ROM, WORM, DVD, digital optical tape, disc storage 300 (FIG. 3), or other optical storage. Another example is direct access storage, such as a conventional "hard drive", redundant array of inexpensive disks ("RAID"), or another direct access storage device ("DASD"). Another example is serial-access storage such as magnetic or optical tape. Still other examples of digital data storage include electronic memory such as ROM, EPROM, flash PROM, EEPROM, memory registers, battery backed-up RAM, etc.

An exemplary storage medium is coupled to a processor so the processor can read information from, and write information to, the storage medium. In the alternative, the storage medium may be integral to the processor. In another example, the processor and the storage medium may reside in an ASIC or other integrated circuit.

Logic Circuitry

In contrast to signal-bearing media that contain machine-executable instructions (as described above), a different embodiment uses logic circuitry to implement processing features such as the execution engine 106 and/or components thereof.

Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS, TTL, VLSI, or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

Figure 4:
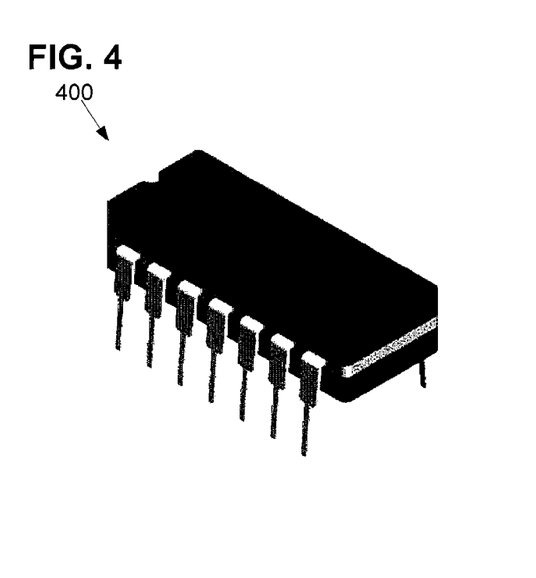
FIG. 4 is a perspective view of logic circuitry.

FIG. 4 shows an example of logic circuitry in the form of an integrated circuit 400.

Operation

Having described the structural features of the present disclosure, the operational aspect of the disclosure will now be described. The steps of any method, process, or algorithm described in connection with the embodiments disclosed herein may be embodied directly in hardware, in a software module executed by hardware, or in a combination of the two.

Overall Sequence of Operation

Figure 5:
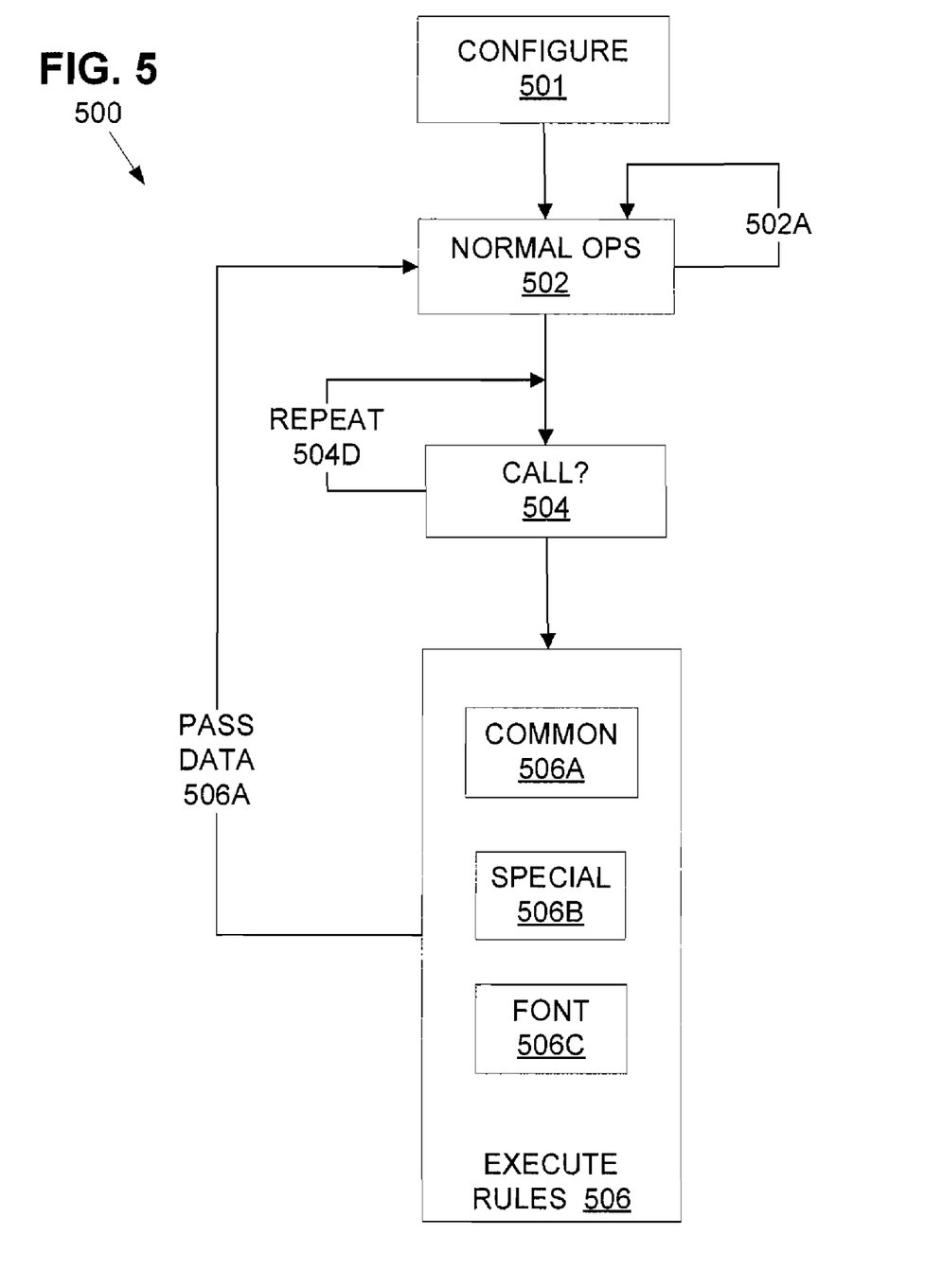
FIG. 5 is a flowchart showing operations to aid in displaying data whose presentation varies by language due to the data's type and/or the nature of user-operation being performed with the data.

FIG. 5 shows a sequence 500 to illustrate one example of the method aspect of this disclosure. Broadly, this sequence 500 employs a set of rules to manage the display of language-variable data on a handheld computing device. When applicable, such rules are invoked to manage aspects of displayed data that vary with language according to the type of data or the nature of the user-initiated operation. For ease of explanation, but without any intended limitation, the example of FIG. 5 is described in the specific context of the system 100 described above (FIG. 1).

Configuration

In step 501, the device 100 is configured. Among other operations, a statement of one or more rules is written to the rules database 118. Step 501 may be performed upon manufacture of the device 100, first start, user configuration, reconfiguration, reprogramming, or other useful time or event.

As part of configuration 501, the device 100 is configured to receive and display data in a particular language. This is referred to as the "language of installation." There may be multiple such languages, but a single one is used in the following discussion for ease of explanation. The language of installation determines which special rules 118b and font rules 118c are installed. Advantageous from the standpoint of ease of manufacture and configuration, the same programs 106b may be used for any language without variation.

Normal Ops

After configuration (501), the device 100 conducts normal operations (502), and particularly, functions of the common programs 106b and their subcomponents. These operations 502 continue, as shown by 502a, to carry on the normal operation of the device 100. In one sense, the operations of step 502 involve various user and device initiated operations that do not require any of the rules 118a-118c.

In step 502, common programs 106b are executed response to various events or triggers. Some examples of the event/trigger include user initiation of an application program, user initiation of an operating system function, operating system initiation of a system application, arrival of a prescheduled time, arrival of a signal from a remote source, occurrence of a repeating scheduled event, occurrence of a predetermined signal or state internal to the device 100, change of state of a common program, I/O operations, or virtually any other hardware or software event relating to the common programs 106b.

Once an event or trigger occurs as described above, the associated common program 106b executes. Some examples of common program execution include initiating or performing ongoing tasks involved in a high level application program such as a word processor, invoking a dialer, opening a spreadsheet, searching through a contacts directory, managing a do-list, text messaging, or hundreds of different operations depending upon the user's desires and the programming of the device 100. Furthermore, normal ops 502 may involve executing a device driver, system function, library task, or other processing task associated with a component of 106b.

Updater

Another example of operations 502 is where the updater 106c executes. In one example, the updater 106c executes in response to an event such as a preset schedule, periodic trigger, manual user activation, remotely transmitted activation signal, etc. In turn, the updater 106c works to correct a faulty installation of the rules 118b, upgrade the rules 118b and/or font 118d, change the device 100's language of installation, or other action beyond updating language.

Advantageously, due to the general purpose architecture of the machine 100, the updater 106c can change the device 100's language of installation by the mere act of replacing the existing special rules 118b and font 118d with different sets applicable to the new language. This enables the device 100 to behave seamlessly according to the new language, without having to change any other components of 100.

To download updates, the updater 106c communicates with a wireless service provider, software manufacturer, after-market software manufacturer, or other entity by wireless connection, Internet, or other link. The act of changing the device's language of installation may be conducted free of cost to the user, or the new language provider may charge a fee to the user.

Call

Step 504 checks whether one of the common programs operating in step 502 has called upon the rules engine 106a. In one example, step 504 is performed by the rules engine 106a determining whether it has received an appropriate call, handoff, interrupt, or other signal from the calling one of the common programs 106b. Step 504 may be performed on a set or variable schedule, periodically, or upon other repeating basis, as shown by step 504d.

As to calls (504) upon the rules engine 106a to perform special rules 506b, in one example the calling common program limits these calls to conditions requiring presentation of data (via the display) that can vary from language to language due to data type, nature of user-operation being performed involving the data, or both. In a different example, the calling program invokes the rules engine 106a before any data is displayed, and the rules engine 106a applies the special rules 506b (or returns data un-transformed) depending upon whether any special rules 118b apply.

As to calls requiring the rules engine 106a to perform special rules 506b, this call 504 may occur for many different reasons, with some examples including user input inserting a line break, user input requesting a scroll up/down operation, user invoking a menu, the operating system or an application program issuing a message to the user, or another processing step. As one specific example, a user, having previously opened an address book application program (106b), selects a function to display an alphabetized list of addressees. In turn, the address book application program calls the rules engine 106a to ensure that the addressees are sorted appropriately according to the language of installation.

Rules Execution

In step 506, when called by one of the common programs 106b, the rules engine 106a executes the appropriate rules in the database 118. Depending upon nature of the request from the common program, the rules engine 106a in step 504 may invoke the common rules 506a, special rules 506b, and/or font rules 506c. Thus, the common programs 106b are structured to take advantage of the shared functions of the rules engine 106a rather than having to always rely on programming of the units 106b themselves. This lends itself to simplifying the common programs 106b.

In some cases, when the programs 106b call upon the engine 106a, the engine 106a carries out the requested function using the common rules 118a (step 506a). In other cases, and namely for matters involving fonts, the engine 106a carries out the requested function using the font rules 118c (step 506c). Advantageously, the font rules 118c aid in displaying text in the fonts appropriate to the language of installation.

In still other cases, the engine 106a carries out requested function using the special rules 118b (step 506b). By employing the special rules 118b, the engine 106a specifically attends to issues concerning the display of data that can appear vary across different languages due to the data's type or user operations being performed on the data. Accordingly, the special rules 118b ensure that data from all particular operations, and data of all types, are displayed properly according to the languages of installation.

In one example of step 506b, the rules database 118 contains multiple sets of special rules 118b (and font rules 118c), and as part of step 506b, the rules engine 106a selects the appropriate set 118b/118c according to the language of installation.

When the rules engine 106a finishes applying the rules, the engine 106a passes the results back to the calling common program (506a).

Examples of Special Rules Execution

In one example of step 506b, a contacts directory application program (106b) has been running in step 502. In step 502, the contacts directory receives user request to display contacts. In order to sort the contacts, the contacts program calls (504) upon the rules engine 106a. In step 506, the rules engine 106a conducts the sorting operation according to the rules 154, which in one example are part of a Dutch special rules set 118b. Accordingly, the rules 154 know features specific to Dutch, such as the rule that the ij character comes before the j character. The rules engine 106a returns (506a) the data, properly sorted, to the calling program 106b in completion of step 506.

In another example of step 506b, a calculator program (106b) has been running in step 502. Through user input (also in 502), the calculator program receives entry of a number. To display the number properly according to the language of installation (Dutch), the calculator activates (504) the rules engine 106a. In step 506b, the engine 106a manipulates the text according to the numbers rule 160, which is part of a Dutch special rules set 118b. Accordingly, the rule 160 observes features specific to Dutch protocol, for example that commas and decimals should be swapped with respect to American representation. The rules engine 106a returns (506a) the data, properly represented for output, to the calling program 106b.

In another example of step 506b, a database application program (106b) is running in step 502. Through user input (also in 502), the database program receives indication that the user is recalling a date for display. In order to properly display the date, the database program calls (504) upon the rules engine 106a. The rules engine 106a conducts (506b) the date display operation according to the rules 162, which in one example are part of a Dutch special rules set 118b. Accordingly, the rules 154 know Dutch protocol, which says that the dates should be represented with the date first, instead of the month first. Accordingly, the rules engine 106a returns (506a) the "19 Feb. 2001" from the database to the calling program 106b.

In another example of step 506b, a word processing program (106b) has been running in step 502. Through user input (also in 502), the word processing program receives user entry of various text. To present the text properly with any appropriate hyphenations according to the language of installation (German in this example), the word processor activates (504) the rules engine 106a. The engine 106a returns (506a) suggested hyphenations according to the hyphenation rule 158, which is part of a German special rules set 118b in this example. Specifically, in step 506b, the rule 158 recognizes appropriate syllable boundaries for German words, and recommends the appropriate word breaks. The rules engine 106a returns (506a) the hyphenation recommendations, or one or more specific hyphenated words, to the calling program 106b.

In another example of step 506b, an operating system program (106b) has been running in step 502. In order to properly present the program's menus according to the language of installation (Dutch in this example), the program activates (504) the rules engine 106a. This may be conducted once for the entire menu system, each time the menu is called upon or displayed, or on a different basis. The engine 106a returns (506a) statements of the menu entries according to the menu rules 170, which is part of a Dutch special rules set 118b in this example. As one example, the rule 170 recognizes (506b) that a particular entry ("Folder" in English) should be represented as the Dutch equivalent "Map." To perform this manipulation (translation), the menu rule 170 references a translation mapping that is contained in the rule or another source. The translation may, for example, between a numerical code for each menu entry and the corresponding word in English, Dutch, Spanish, or language of installation. The rules engine 106a returns (506a) the translation recommendations to the calling program 106b.

Message rules 170 operate in similar fashion, but for system generated messages. Message rules map between system generated messages, such as an alphanumeric code or English message "OK to delete?", and their phrasing in the language of installation such as "Wissen?" in Dutch.

As another example of step 506b, a word processing program (106b) is running in step 502. This program is receiving user input via telephone keypad (104). More particularly, the user is entering text using numeric telephone keys, and the user's output is inherently ambiguous because each key corresponds to multiple letters. Therefore, it is not entirely clear whether the user's entry of "6-3-3" corresponds to "M-E-N" or "O-E-M." If English is not the language of installation, the keys have an entirely different character mapping, but still, the user's entry is unclear. To display the proper word choices, a disambiguation function called by the word processing program triggers (504) the rules engine 106a. The rules engine 106a invokes (506b) the disambiguation guidelines 175 for the language of installation, which in this example provide a vocabulary of English words. Accordingly, the rules 154 suggest that the user's entry might correspond to "men" or "oem" or "neo" or the start of another word such as "oenophile," etc. The rules engine 106a passes this information back (506a) to the disambiguation function that called the engine 106a.

As another example of step 506b, an operating system program or system function (106b) is running in step 502. More particularly, through user input in step 502 this program 106b receives a series of requests to adjust the hardware configuration of the machine 100. At some point, the one of these user requests cannot be carried out, and it must be denied for some reason. To communicate the error properly to the user via graphics, the program calls (504) upon the rules engine 106a. The rules engine 106a derives the appropriate graphics symbol according to the rules 180. For example, in an English language implementation, it may be useful to communicate the error with a graphic showing a hand gesture indicating "Halt." However, in another language, this hand gesture may be considered offensive, so the rules 180 dictate using a symbol depicting a different hand gesture or another object entirely. The rules engine 106a returns the appropriate graphics symbol to the calling program 106b in step 506a.

After Executing Rules

When the rules engine 106a finishes applying the rules, the engine 106a passes the results back to the calling common program (506a). Still, after step 506, the routine 500 is not finished. Namely, the common programs continue (502a) to operate the device 100. Further, step 504 is still performed on a repeating basis (504d) to give the rules engine 106a an opportunity to act promptly upon calls from the common programs 106b.

In the case of special rules 118b, which pertain to the display of data that varies by language, after data passage (506a) there is still more work to do in presenting the data to the user. Namely, the same or different common program that invoked (504) the special rules 118b then calls the rules engine 106a to obtain the proper font information (via font rules 118c, in step 506c). Font information passed back (506a) to the calling program is used by other common programs, such as graphics rendering, to display the data properly at the user output 102.

OTHER EMBODIMENTS

While the foregoing disclosure shows a number of illustrative embodiments, it will be apparent to those skilled in the art that various changes and modifications can be made herein without departing from the scope of the invention as defined by the appended claims. Accordingly, the disclosed embodiment are representative of the subject matter which is broadly contemplated by the present invention, and the scope of the present invention fully encompasses other embodiments which may become obvious to those skilled in the art, and that the scope of the present invention is accordingly to be limited by nothing other than the appended claims.

All structural and functional equivalents to the elements of the above-described embodiments that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 USC 112, sixth paragraph, unless the element is expressly recited using the phrase "means for" or, in the case of a method claim, the phrase "step for."

Furthermore, although elements of the invention may be described or claimed in the singular, reference to an element in the singular is not intended to mean "one and only one" unless explicitly so stated, but shall mean "one or more". Additionally, ordinarily skilled artisans will recognize that operational sequences must be set forth in some specific order for the purpose of explanation and claiming, but the present invention contemplates various changes beyond such specific order.

In addition, those of ordinary skill in the relevant art will understand that information and signals may be represented using a variety of different technologies and techniques. For example, any data, instructions, commands, information, signals, bits, symbols, and chips referenced herein may be represented by voltages, currents, electromagnetic waves, magnetic fields or particles, optical fields or particles, other items, or a combination of the foregoing.

Moreover, ordinarily skilled artisans will appreciate that any illustrative logical blocks, modules, circuits, and process steps described herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. A handheld computing apparatus, comprising:
  a display to present human-readable information;
  a user input facility; and
  a digital data processing apparatus coupled to the display and the user input facility and programmed to provide the following:
    at least one application program module programmed to perform designated application program tasks and currently configured such that output is presented in a current operating language, the application programs module further programmed to perform operations comprising:
      responsive to events requiring the application program module to present given data, before any presenting of said given data the application program determining any of: (1) if a type of said given data matches any entry of a predetermined type listing, (2) if an operation being performed by said application program upon said given data matches any entry of a predetermined operation listing;
      where entries of the type listing include various data types all having the following in common: different languages would require presentation of data of said data types differently solely due to said type of data and independent of any translation;
      where the entries of the operation listing include various operations having the following in common: different languages would require presentation of data undergoing any of said operations differently solely due to a nature of said operation and independent of any translation;
      if said determining operation answers NO, then the application program module presenting the data;
      if said determining operation answers YES, then the application program module refraining from presenting said given data and instead performing operations including invoking a rules engine as to said given data and identifying the current operating language to the rules engine and thereafter instead of presenting the given data presenting manipulated data returned by the rules engine;
    a rules module prescribing rules to manipulate any of data matching said type listing or said operation listing for presentation appropriate to said current operating language, said manipulation being independent of translation;
    a rules engine responsive to being invoked by any of the application programs modules to perform operations comprising identifying in said rules module each rule applicable to the given data and the current operating language, applying the identified rule to manipulate the given data for presentation appropriate to the current operating language, and returning the manipulated data to the application program module that invoked the rules engine.

2. The apparatus of claim 1, where:
the type listing entries include all of the following data types: dates, times, currency, numbers;
the operation listing entries include all of the following operations performed by said application program module upon data: hyphenation of data, sorting of data.

3. The apparatus of claim 1, where said different languages include any of different dialects and locales.

4. The apparatus of claim 2, further comprising:
a selectively activated update module programmed to respond to activation by performing operations including obtaining updates from a remote location and applying the updates to the rules module, the updates including rules to manipulate any of data matching said type listing or said operation listing for presentation appropriate to one or more additional languages different than the current operating language, said manipulation being independent of translation.

5. The apparatus of claim 1, where the type listing further includes words having predetermined constituent letters requiring font adjustments in one or more languages.

6. The apparatus of claim 1, where the type listing further includes inherently ambiguous user keypad input with multiple interpretations and where the rules include disambiguation guidelines for resolving user input with multiple interpretations against a vocabulary in the current operating language.

7. The apparatus of claim 1, where said rules include rules to display graphics elements appropriate to the current operating language.

8. The apparatus of claim 1, where the rules comprise regular expressions prescribing different manipulations of input strings to output strings.

9. The apparatus of claim 1, where said rules include rules to replace one or more text characters with one or more different characters.

10. The apparatus of claim 1, where:
said rules include rules to reorder characters of a text string.

11. The apparatus of claim 1, where said rules include rules to find syllable boundaries and hyphenate text as appropriate to said current operating language.

12. The apparatus of claim 1, where said rules include rules to sort text as appropriate to the current operating language.

13. The apparatus of claim 1, where said rules include rules to observe a format of representing one or more of the following in a manner appropriate to the current operating language: numbers, currency, date, time.

14. The apparatus of claim 1, where said rules include rules to represent menu text of the application program module according to the current operating language.

15. The apparatus of claim 1, where said rules include rules to represent system or program messages of the application program module in the current operating language.

16. A computer-implemented method of operating a handheld computing apparatus including a display to present human-readable information, a user input facility, and a digital data processing apparatus coupled to the display and the user input facility and programmed to provide at least one application program module, a rules module, and a rules engine, the method comprising operations of:
the application program module performing designated application program tasks and presenting output in a current operating language, the application program module performing further operations including;
responsive to events requiring the application program module to present given data, before any presenting of said given data the application program determining any of: (1) if a type of said given data matches any entry of a predetermined type listing, (2) if an operation being performed by said application program upon said given data matches any entry of a predetermined operation listing;
where entries of the type listing include various data types all having the following in common: different languages would require presentation of data of said data types differently solely due to said type of data and independent of any translation;
where the entries of the operation listing include various operations having the following in common: different languages would require presentation of data undergoing any of said operations differently solely due to a nature of said operation and independent of any translation;
if said determining operation answers NO, then the application program module presenting the data;
if said determining operation answers YES, then the application program module refraining from presenting said given data and instead performing operations including invoking a rules engine as to said given data and identifying the current operating language to the rules engine and thereafter instead of presenting the given data presenting manipulated data returned by the rules engine;
the first rules module prescribing rules to manipulate any of data matching said type listing or said operation listing for presentation appropriate to said current operating language, said manipulation being independent of translation;
the rules engine responding to being invoked by any of the application program modules to perform operations comprising identifying in said first rules module each rule applicable to the given data and the current operating language, applying the identified rule to manipulate the given data for presentation appropriate to the current operating language, and returning the manipulated data to the application program module that invoked the rules engine.

17. The method of claim 16, the handheld computing apparatus further including a selectively activated update module, and the method further comprising:
the update module responding to activation by performing operations including obtaining updates from a remote location and applying the updates to the rules module, the updates including rules to manipulate any of data matching said type listing or said operation listing for presentation appropriate to one or more additional languages different than the current operating language, said manipulation being independent of translation.

18. The method of claim 16, the operations further comprising charging a fee to a user of the handheld computing apparatus in exchange for providing the updates.

19. A digital data processing apparatus for use in a handheld computing device having a display to present human-readable information and a user input facility, where said digital data processing apparatus comprises circuitry of multiple interconnected electrically conductive elements arranged to provide components including:
at least one application program module programmed to perform designated application program tasks and currently configured such that output is presented in a current operating language, the application programs module further programmed to perform operations comprising:

responsive to events requiring the application program module to present given data, before any presenting of said given data the application program determining any of: (1) if a type of said given data matches any entry of a predetermined type listing, (2) if an operation being performed by said application program upon said given data matches any entry of a predetermined operation listing;

where entries of the type listing include various data types all having the following in common: different languages would require presentation of data of said data types differently solely due to said type of data and independent of any translation;

where the entries of the operation listing include various operations having the following in common: different languages would require presentation of data undergoing any of said operations differently solely due to a nature of said operation and independent of any translation;

if said determining operation answers NO, then the application program module presenting the data;

if said determining operation answers YES, then the application program module refraining from presenting said given data and instead performing operations including invoking a rules engine as to said given data and identifying the current operating language to the rules engine and thereafter instead of presenting the given data presenting manipulated data returned by the rules engine;

a rules module prescribing rules to manipulate any of data matching said type listing or said operation listing for presentation appropriate to said current operating language, said manipulation being independent of translation;

a rules engine responsive to being invoked by any of the application program modules to perform operations comprising identifying in said rules module each rule applicable to the given data and the current operating language, applying the identified rule to manipulate the given data for presentation appropriate to the current operating language, and returning the manipulated data to the application program module that invoked the rules engine.

20. The apparatus of claim 1, further comprising:

a second rules module prescribing rules to manipulate any of data matching said type listing or said operation listing for presentation appropriate to a further language different than said operating language, said manipulation being independent of translation.

\* \* \* \* \*